US011001056B2

(12) United States Patent
Pierik et al.

(10) Patent No.: US 11,001,056 B2
(45) Date of Patent: May 11, 2021

(54) PRINTING CONTROL DEVICE TO CONTROL PRINTING OF A COVER LAYER ON A SAMPLE

(71) Applicant: KONINKLIJKE PHILIPS N.V., Eindhoven (NL)

(72) Inventors: Anke Pierik, Eindhoven (NL); Reinhold Wimberger-Friedl, Eindhoven (NL); Danielle Elisa Willemine Clout, Eindhoven (NL); Fei Zuo, Eindhoven (NL); Ruud Vlutters, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/567,463

(22) PCT Filed: Apr. 1, 2016

(86) PCT No.: PCT/EP2016/057178
§ 371 (c)(1),
(2) Date: Oct. 18, 2017

(87) PCT Pub. No.: WO2016/169745
PCT Pub. Date: Oct. 27, 2016

(65) Prior Publication Data
US 2018/0104948 A1 Apr. 19, 2018

(30) Foreign Application Priority Data
Apr. 20, 2015 (EP) ..................................... 15164171

(51) Int. Cl.
*B41J 2/15* (2006.01)
*B41J 2/045* (2006.01)
*G01N 1/28* (2006.01)

(52) U.S. Cl.
CPC ....... *B41J 2/04508* (2013.01); *B41J 2/04586* (2013.01); *G01N 1/2813* (2013.01); *G01N 2001/282* (2013.01)

(58) Field of Classification Search
CPC ............... B41J 2/2121; G05B 19/4099; G01N 29/0609
See application file for complete search history.

(56) References Cited

U.S. PATENT DOCUMENTS 6,684,048 B2    1/2004   Caruthers
6,702,425 B1 *  3/2004   Yip ........................ B41J 2/2121
                                                            347/101
(Continued)

FOREIGN PATENT DOCUMENTS

KR      101092556 B1    12/2011
WO      2007024264 A2   3/2007
(Continued)

*Primary Examiner* — Lam S Nguyen
(74) *Attorney, Agent, or Firm* — Sherry Austin

(57) ABSTRACT

The invention relates to a printing control device (10) to control printing of a cover layer on a tissue or cell sample to be examined, a system (1) for printing of a cover layer (1) on a tissue or cell sample to be examined, a method to control printing of a cover layer on a tissue or cell sample to be sample to be examined, a computer program element for controlling such device or system for performing such method and a computer readable medium having stored such computer program element. The printing control device (10) comprises an imaging unit (11) and a printing control unit (12). The imaging unit (11) is configured to provide image data of the sample, and to determine a local image parameter from the image data. The local image parameter relates to local tissue porosity and/or a local capillary force of the sample. The printing control unit (12) is configured to control a printing parameter for printing the cover layer on the sample based on the local image parameter.

17 Claims, 8 Drawing Sheets a)   b)

(56) References Cited

U.S. PATENT DOCUMENTS

| | | | |
|---|---|---|---|
| 9,632,037 B2* | 4/2017 | Chen | G05B 19/4099 |
| 2013/0155162 A1 | 6/2013 | Ohtsuka | |
| 2014/0198946 A1* | 7/2014 | George | G01N 29/0609 |
| | | | 382/103 |
| 2015/0057785 A1 | 2/2015 | Liu et al. | |

FOREIGN PATENT DOCUMENTS

| | | |
|---|---|---|
| WO | 2013015740 A1 | 1/2013 |
| WO | 2014015994 A1 | 1/2014 |
| WO | 2014053955 A1 | 4/2014 |
| WO | 2014184005 A1 | 11/2014 |

* cited by examiner a)　　　　　　　　　b)

PRINTING CONTROL DEVICE TO CONTROL PRINTING OF A COVER LAYER ON A SAMPLE

CROSS-REFERENCE TO PRIOR APPLICATIONS

This application is the U.S. National Phase application under 35 U.S.C. § 371 of International Application No. PCT/EP2016/057178, filed on Apr. 1, 2016, which claims the benefit of European Patent Application No. 15164171.9, filed on Apr. 20, 2015. These applications are hereby incorporated by reference herein.

FIELD OF THE INVENTION

The invention relates to a printing control device to control printing of a cover layer, and in particular of a cover layer on a tissue or cell sample to be examined, a system for printing of a cover layer on a tissue or cell sample to be examined, a method to control printing of a cover layer on a tissue or cell sample to be examined, a computer program element for controlling such device or system for performing such method and a computer readable medium having stored such computer program element.

BACKGROUND OF THE INVENTION

WO 2014/184005 A1 discloses a method and a sample separation device for a separation of material from a region of interest, the "sample-ROI", in a biological sample. An embodiment of the invention comprises the application of a structured cover sheet that has an aperture at the sample-ROI. Sample material can then selectively be removed from the sample-ROI through the aperture in the cover sheet. The cover sheet may for example be a tape with an adhesive on one side. The aperture in the cover sheet may automatically be cut out after the selection of a region of interest in a microscopic image of the sample. Alternatively, the structured cover sheet maybe produced by printing or plotting. Moreover, sample material may preferably be removed by lysing and may further be subjected to molecular diagnostics.

Such printing of a cover sheet or layer may still be improved.

SUMMARY OF THE INVENTION

Hence, there may be a need to provide an improved printing control device, system and method to control printing of a cover layer on a tissue or cell sample to be examined, which are in particular improved in view of the printing quality.

The problem of the present invention is solved by the subject-matters of the independent claims, wherein further embodiments are incorporated in the dependent claims. It should be noted that the aspects of the invention described in the following apply also to the printing control device to control printing of a cover layer on a tissue or cell sample to be examined, the system for printing of a cover layer, the method to control printing of a cover layer on a tissue or cell sample, the computer program element, and the computer readable medium.

According to the present invention, a printing control device to control printing of a cover layer on a tissue or cell sample to be examined is presented. The printing control device comprises an imaging unit and a printing control unit. The imaging unit is configured to provide image data of the sample and to determine a local image parameter from the image data. The local image parameter relates to local tissue porosity and/or a local capillary force of the sample. A determination of local tissue porosity and capillary force is explained in detail in FIGS. 2 to 4. The printing control unit is configured to control a printing parameter for printing the cover layer on the sample based on the local image parameter.

In other words, image analysis may be used to establish local tissue porosity and/or capillarity and to use that as input to optimize a printing process to create a preferably fully closed and dense cover layer outside a region of interest (ROI). The printing process may be controlled mainly via the effective local pitch of the printed droplets and the sequence of applying them.

In other words, the invention may relate to a device and a method for printing a cover layer outside an ROI on a tissue, smear or cell sample for sample extraction. It can be used for carrying out e.g. molecular tests (MDX) in oncology diagnostics like sequencing and PCR for cancer patient stratification, or in general for all applications where reagents or inks are deposited onto substrates with porous, inhomogeneous morphologies.

The tissue or cell sample may be a slice of body tissue or a layer of cells on a slide, stained or unstained, for use in digital and/or molecular pathology. Typically materials of the slide, carrier or substrate on which a sample may be provided comprise glass, transparent plastic, and/or composites of glass and plastic, optionally with a surface layer for the desired interaction with the biological sample.

Possible staining assays comprise for example H&E (Hematoxylin-Eosin) for morphology, IHC (immuno-histochemistry), IF (immuno-fluorescence), FISH (fluorescence in situ hybridization), PLA (proximity ligation assay), PPA (padlock probe assay), rolling circle amplification, RCA, branched DNA signal amplification, and combinations of all these techniques or other assays to obtain particular biological information. The staining may especially help to identify particular cell types or tissue types, and/or molecules which indicate a specific property or function or abnormality of the cell.

Ink jet printing technology, (micro-) contact printing of any kind or the like may be used. A printing parameter in form of printing pattern and sequence may be determined based on a local image parameter to achieve the best spatial resolution and contrast. The tissue parameters may be determined from image data as an H&E image that is obtained with a digital pathology scanner.

The image data of the sample may be a microscopic image, i.e. it reveals details not visible to the naked eye. Additionally or alternatively, it may be a digital image, thus allowing for the application of versatile digital image processing procedures. Furthermore, the image may be generated by scanning, i.e. by the sequential generation of sub-images of smaller parts of the sample. Furthermore, the generated microscopic image can be a bright field or fluorescence image, or a combination of different images. From the image data, the distribution of tissue or cell material porosity and capillarity may be calculated as local image parameter(s). The local image parameters may then be used to determine a local resolution or pitch of printed droplets and a sequence of printing these droplets. In this way, a better printing quality and in particular a better printing accuracy and reproducibility may be obtained and the designed ROI may be transferred to a printed cover or barrier layer or coating with higher precision and fidelity. As a result, an optimized print strategy using image analysis can be achieved, which can be used for sample selection for e.g. MDX. The selection of tissue or cell material is thereby also improved in view of accuracy and reproducibility.

In other words, since tissue or cell material may be inhomogeneous, porosity and capillary forces and thereby an extent of penetration of ink into surrounding tissue or cell material may vary with tissue porosity and capillary forces. As a result, an optimal and uniform cover layer thickness over a sample can be achieved by using locally differing printing settings. The printed cover layer may be fully closed outside the ROI and fully absent inside the ROI.

In other words, the invention may relate to a device for strategically printing a ROI on a tissue or cell sample for sample selection and/or extraction for e.g. molecular diagnostics. Thereby, an easy integration of digital pathology and molecular diagnostics is achieved. In an example, the printing control unit is configured to control the printing parameter for printing and in particular ink jet printing the cover layer related to at least a region of interest of the sample. The ROI can be of arbitrary shape and size. Multiple, separate areas can comprise a region of interest. In an example, the printing control unit is configured to control the printing parameter for printing and in particular ink jet printing the cover layer to spare at least a region of interest of the sample out of which biomolecules are to be extracted or another treatment is envisaged. By sparing a region of interest, a relevant area of tissue or cell material can be selected or indicated out of which biomolecules are to be extracted. A non-relevant area of tissue or cell material can be covered by the cover layer, so that no extraction of biomolecules or other treatment is possible. The biomolecules can then be analyzed using further downstream analysis methods. The biomolecules can be nucleic acids, proteins and the like.

A selection of a ROI may be done automatically by appropriate image processing routines, by manual input of a user, or by a mixture of both. Accordingly, the device may comprise an image analysis module, for example a digital microprocessor with associated software for the analysis of digital images. Additionally or alternatively, it may comprise a user interface comprising input means by which a user can input data referring to the selection of an ROI. Typically, the user interface will also comprise output means, for example a display or monitor on which the image of the sample can be shown, optionally together with a representation of the currently defined ROI and optionally with a representation of the local image parameters used as input for the printing parameter and optionally a representation of the local printing parameter as calculated. The output means may allow for a representation of the sample image with adjustable zooming factor. The image analyzer may be a digital data processing unit with appropriate image processing software by which a local image parameter can be determined automatically.

In an example, the printing parameter is at least one of a group comprising a local pitch of printing droplets, a sequence of printing sweeps and a shape or the height of a print pulse. The local pitch of printing droplets comprises a Y-pitch as a resolution used in a forward print direction, which is called Y-direction, wherein this Y-pitch can be freely chosen limited by a firing frequency of a print head divided by the speed. The local pitch of printing droplets further comprises an X-pitch as a resolution used in an X-direction perpendicular to the Y-direction and being a multiplication of a nozzle pitch of the print head. For both pitches it is assumed that, the smaller the pitch, the larger the average thickness of the resulting layer.

Another printing parameter is a sequence of printing sweeps, when a printing pattern is distributed over several sweeps. In this way, the X-pitch can be adjusted by choosing offsets that are smaller than the X-pitch. At the same time, the printing pattern can be varied locally to achieve the required resolutions. Since liquid spreading is a dynamic process, sequential spreading can help to control the flow direction of the liquid and the control over the final liquid distribution. A determination of a local pitch of printing droplets and a sequence of printing sweeps is explained in detail to FIGS. 5 to 8.

Another printing parameter is a shape or the height of a print pulse. Usually, a print pulse consists of a block pulse which means a voltage applied to the nozzles during a period of time. The pulse can either be a positive or a negative pulse, which influences the droplet volume. Other factors that can influence the droplet volume are the pulse width (duration of the pulse) or the steepness of the rise and fall of the pulse. Furthermore a double pulse can be applied to the print head.

In an example, the imaging unit is configured to provide image data of the sample after a previous or first print step to derive a local image parameter that relates to the spreading of the ink on the sample. The printing control unit is then configured to control an initial printing parameter for initially printing an initial cover layer on the sample independent of a local image parameter. In an example, the local image parameter relates to a local spreading characteristic of a printing ink on the sample. Here, without determining a local image parameter from the image data or analyzing an image before printing, an ink layer or a particular pattern of ink is deposited first or initially onto the larger areas, where there is no risk of flooding the ROI. Then, image data of the sample are provided or an image is made and a local ink spreading is analyzed. Based on the local ink spreading as local image parameter, a printing parameter for printing the cover layer on the sample or a second print bitmap can be created to fine-tune the first or initially printing pattern. Then, a local image parameter can be determined from the image data of the twice printed sample, wherein the local image parameter relates to local tissue porosity and/or a local capillary force of the sample, and a printing parameter for a third printing of the cover layer on the sample can be determined based on this local image parameter.

In an example, the printing control unit is further configured to control a curing parameter for curing the initial cover layer and/or the cover layer after printing at least partially. This means, curing by e.g. UV-light can be made as intermittent curing between printing steps and/or as final curing after a single or final printing. A cured (part of the) cover layer does not contribute to the liquid and therefore helps to control e.g. a flow of ink in a consecutive printing step. Local spreading is easier to predict than cumulative spreading. As an example, one can print a closed front around an ROI in the first step in which the ROI definition is controlled by the 1-dimensional spreading of this front. After curing, the area outside the ROI is confined by a dyke and can therefore be filled up with a thicker layer of ink without risk of spreading into the ROI.

According to the present invention, also a system for printing of a cover layer on a tissue or cell sample to be examined is presented. The system comprises a printing control device as explained above, and a printing module. The printing control device is configured to control the printing of the cover layer on the sample. The printing module is configured to print the cover layer on the sample.

The printing module can work either as a unit integrated with a digital pathology image management system (IMS) or as a stand-alone unit with an integrated camera. In both cases, either high resolution images (from a digital pathology (DP) scanner) or snapshot images (from the printer) are available. In case that the image comes from the DP scanner, first registration of this image with the image on the system for printing needs to take place.

The system may further comprise a visualization module. Different ways of visualization of a result of an image analysis can be used, e.g. a porosity map of the tissue can be made, or only sections with substantially deviating properties can be marked.

Exemplarily, the local image parameters used for printing optimization can also be used for feedback during ROI selection. In other words, knowledge of the tissue properties can be used to provide feedback for the ROI selection in the first place. ROIs indicated by a pathologist or determined by other image analysis software tools can be corrected for ease of printing beforehand and the properties of a new ROI can be displayed.

According to the present invention, also a method to control printing of a cover layer on a tissue or cell sample to be examined is presented. It comprises the following steps, not necessarily in this order:
  providing image data of the sample,
  determining a local image parameter from the image data, and
  controlling a printing parameter for printing the cover layer on the sample based on the local image parameter.

The local image parameter relates to local tissue porosity and/or a local capillary force of the sample.

In an example, the method further comprises a step of controlling an initial printing parameter for initially printing an initial cover layer on the sample. This initial printing can be made before step a).

In an example, the method further comprises a step of controlling a curing parameter for curing the initial cover layer and/or the cover layer. This curing by e.g. exposure to UV light or a heating step can be made after an initial printing and/or after step c).

In an example, the method further comprises a step of removing a region of interest of the sample after printing of the cover layer. Exemplarily, the step is a removing a region of interest of the sample which is indicated and/or not covered by the cover layer. Exemplarily, the step is a removing of molecules from the region of interest after printing of the cover layer. The removing can be made after step c).

In other words, a pathologist may select cells or tissue inside a region of interest in a tissue slide during a sample selection process. E.g. nucleic acids need to be extracted only from this ROI to enable subsequent molecular analysis. In detail, the pathologist may select the ROI on a graphical user interface, map this ROI on the tissue slide to be used for molecular testing, cover everything except the ROI with a cover layer being deposited via e.g. inkjet printing, cure the cover layer to achieve a solid layer on the tissue by e.g. exposure to UV light, and expose the entire slide to an extraction medium, resulting in release of nucleic acids only from the tissue which is not covered by the cover layer.

According to the present invention, also a computer program element is presented, wherein the computer program element comprises program code means for causing the device and/or the system as defined in the independent claim to carry out the steps of the method as defined in the independent claim when the computer program is run on a computer controlling the system.

It shall be understood that the the printing control device to control printing of a cover layer, the system for printing of a cover layer, the method to control printing of a cover layer on a tissue or cell sample, the computer program element for controlling such device and the computer readable medium having stored such computer program element according to the independent claims have similar and/or identical preferred embodiments, in particular, as defined in the dependent claims. It shall be understood further that a preferred embodiment of the invention can also be any combination of the dependent claims with the respective independent claim.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the accompanying drawings.

DETAILED DESCRIPTION OF EMBODIMENTS

In fact, tissue is a porous material. For the purpose of tissue selection for e.g. MDX, an FFPE (formalin-fixed, paraffin-embedded) tissue section is provided on a glass slide. Before printing, the paraffin is extracted by immersion in e.g. xylene and ethanol/water mixtures in several steps. As a result of tissue processing, liquids and fat are substantially removed from the tissue, leaving an open, porous structure behind. The local porosity and average density of the processed tissue depends on the original composition. During printing, the liquid ink will spread on the tissue. A minimum layer thickness is required to create a cover or barrier layer. However, since tissue consists of a lot of capillaries, capillary forces lead to spreading of the ink. If too much ink is printed on the tissue, this spreading can be significant and less controlled (determined by e.g. the orientation of the capillaries). This means that cells present within the ROI could be covered with ink. There is thus a balance between fully covering the tissue and minimizing the spread of the liquid into the ROI. For a required spatial resolution and predictability of the printed ROI, it is necessary to control the spreading and account for it in the printing process.

Figure 1:
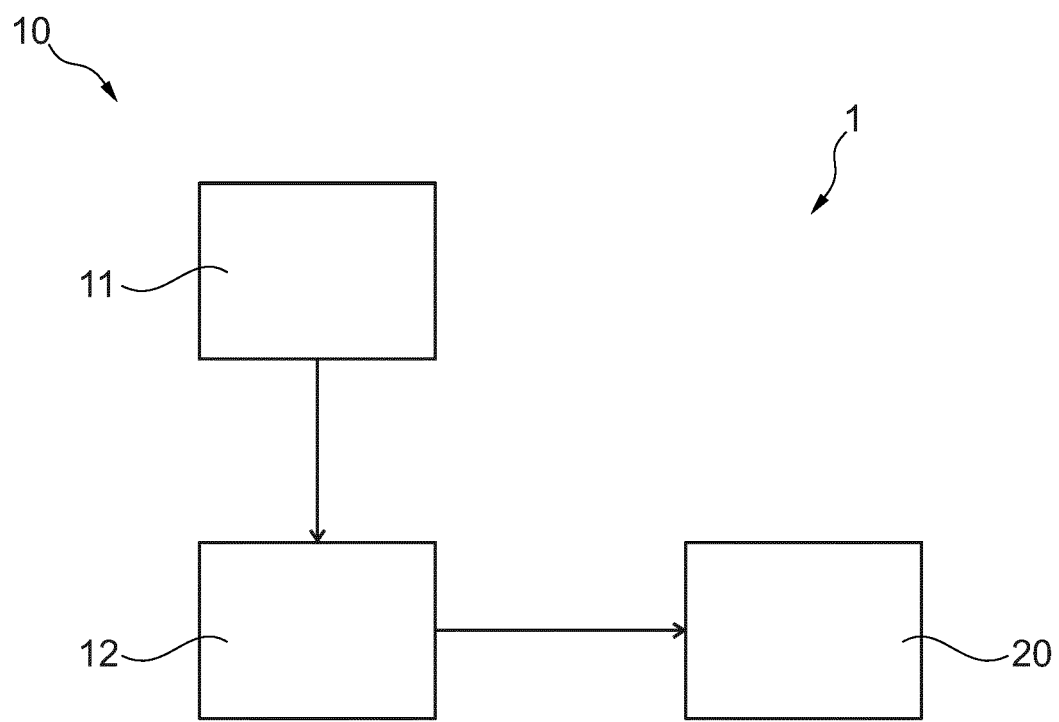
FIG. 1 shows a schematic drawing of an example of an embodiment of a system for printing of a cover layer on a tissue or cell sample to be examined.

FIG. 1 shows schematically and exemplarily an embodiment of a system 1 for printing of a cover layer on a tissue or cell sample to be examined. The system 1 comprises a printing control device 10 and a printing module 20. The printing module 20 prints the cover layer on the sample. The printing control device 10 controls the printing of the cover layer on the sample. The printing control device 10 comprises an imaging unit 11 and a printing control unit 12. The imaging unit 11 provides image data of the sample and determines a local image parameter from the image data. The local image parameter relates to local tissue porosity and/or a local capillary force of the sample. The printing control unit 12 controls a printing parameter for printing the cover layer on the sample based on the local image parameter. The printing parameter is at least one of a group comprising a local pitch of printing droplets, a sequence of printing sweeps and a shape of a print pulse.

The printing control unit 12 may further control an initial printing parameter for initially printing an initial cover layer on the sample independent of an image parameter. Then, the local image parameter may relate to a local spreading characteristic of a printing ink on the sample.

The printing control unit 12 may further control a curing parameter for curing the initial cover layer and/or the cover layer after printing. This means, curing can be made as intermittent curing between printing steps and/or as final curing after a single or final printing.

In the following, an example of determining a local image parameter from image data is explained and in particular deriving tissue morphology from tissue images. E.g. hematoxylin—and eosin (H&E) stained images can be analysed for stain uptake using colour de-convolution. Using a threshold, all areas with an intensity above the threshold are designated as empty. The empty areas are then connected virtually by a software algorithm. An average tissue coverage can be calculated at different length scales to establish an average porosity. Features of the empty areas are calculated, like the local smallest dimension. Knowing the height of the tissue section and using an average contact angle for the ink then allows calculating the capillary forces in all directions at various length scales. In this way, a heat map of capillary forces (vectorial) is established and combined with the porosity map. The latter determines how much ink volume will end up in between the tissue structure. This is necessary to calculate the total volume required to achieve a certain layer thickness above the tissue. The capillary force vector map is the input for a numerical model that can calculate the local spreading.

Figure 2:
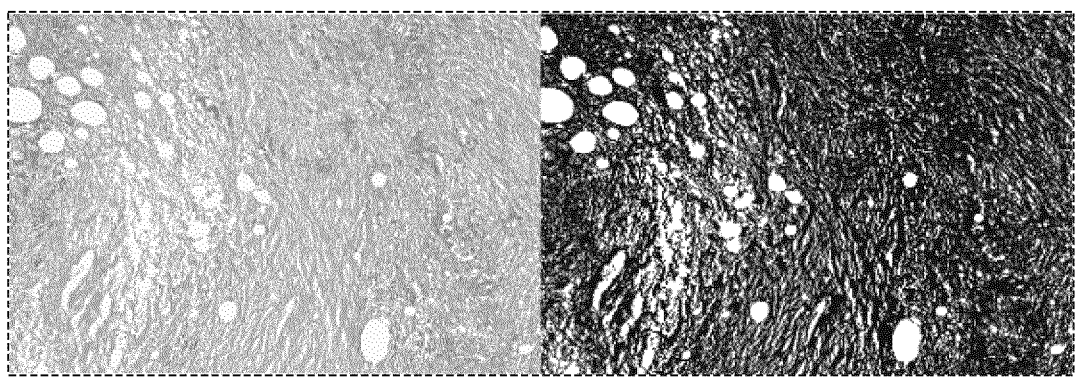
FIGS. 2 and 3 show each schematically and exemplarily image data as a picture a), a black & white version b) of the respective picture.
Figure 3:
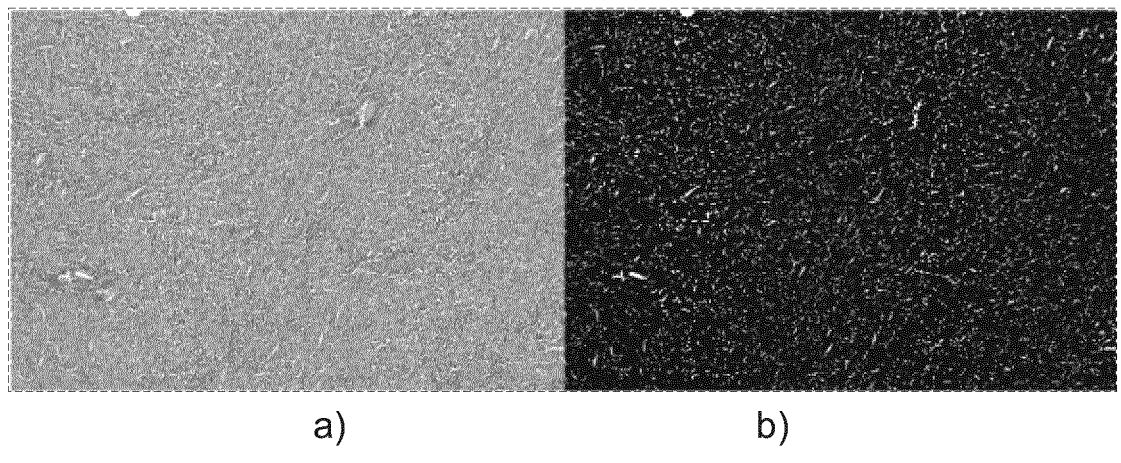
Figure 4A:
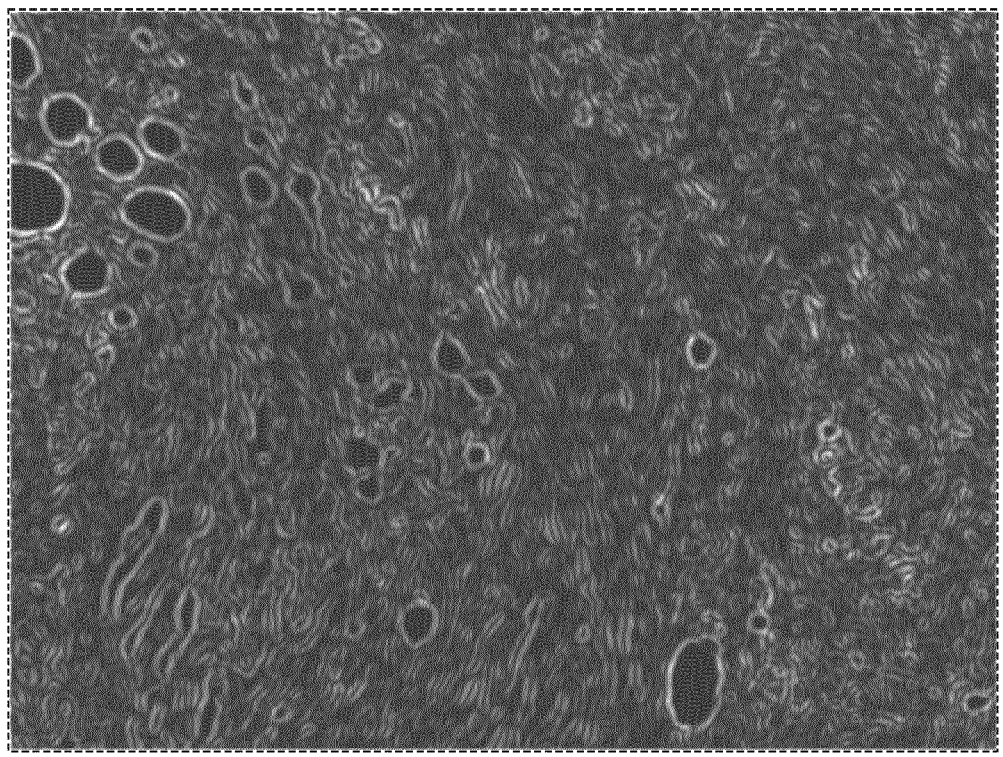
FIG. 4 shows schematically and exemplarily a use of gradient information to capture capillary properties.
Figure 4B:
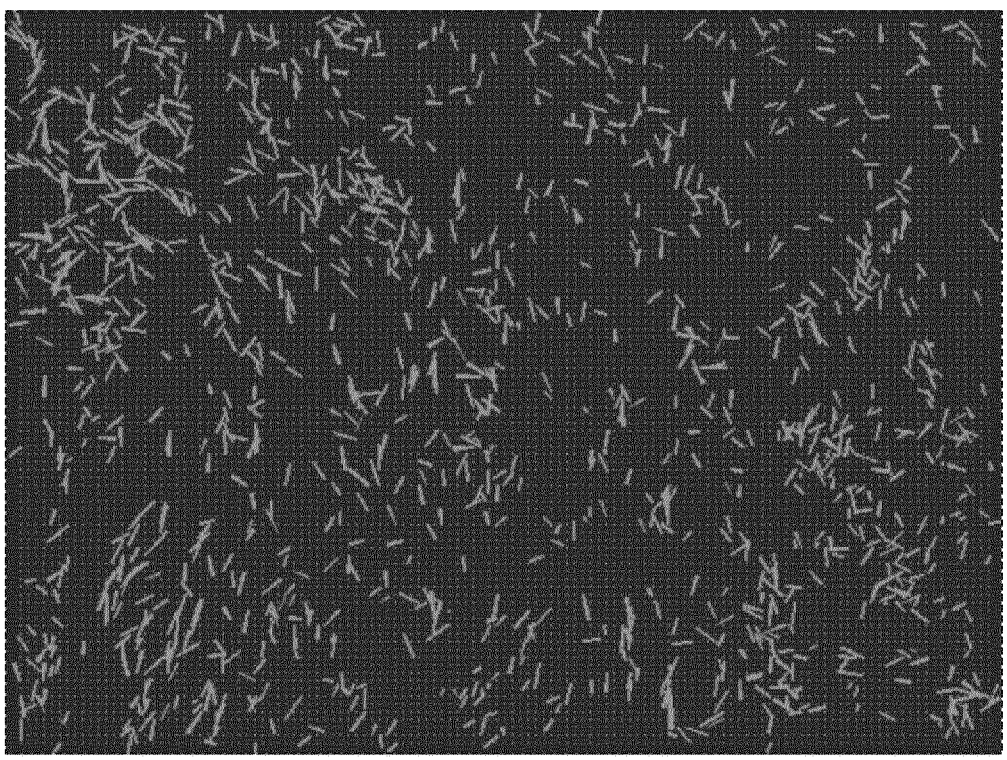

Two example images are given in FIGS. 2 and 3 showing each a picture a) as provided image data, a black & white version b) of the respective picture. FIGS. 2 and 3 show a porosity measure from a tissue segment, wherein an H&E image is shown on the left and a black and white virtual image with white pixels representing open areas and black pixels representing tissue is shown on the right. Thereby, FIGS. 2 and 3 show how to use image analysis to find automatically an empty space from a given local area by using thresholding. The percentage of the empty pixels of this local area can be used as one parameter to correlate to the porosity. Other measures can be also used which can take into account the structure of the empty areas such as the local density. For larger areas, the local porosity measure can be calculated to generate a total map. FIG. 4 shows the use of gradient information to capture capillary properties. The images are derived from the example images shown in FIG. 2. One image feature that can be related to a capillary force from a tissue segment is a gradient (edge) structure and orientation. For example, a gradient magnitude (left) and orientation or direction (right) can be extracted from an image to characterize a capillary structure from a given area. Further statistics such as an average gradient magnitude or a histogram of a given area can be correlated with an amount of capillary forces that influence a printing behaviour.

An alternative approach uses the local smallest dimensions of the white space to calculate capillarity. A capillary force scales with an inverse of the smallest dimension. A direction of the capillary force is perpendicular to a direction of the smallest dimension. A specific capillary force of a used ink and substrate can be calibrated using well-defined structures that can be prepared for instance with the aid of lithography.

By combining image features that are derived from calibration structures, a model can be calibrated to accurately predict a printing behaviour from capillarity and porosity. This model can then be implemented and optionally optimized by training on tissue samples. The calibrated model is then used to translate a ROI into a printing pattern taking into account the calculated tissue parameters derived from the H&E image.

Figure 5:
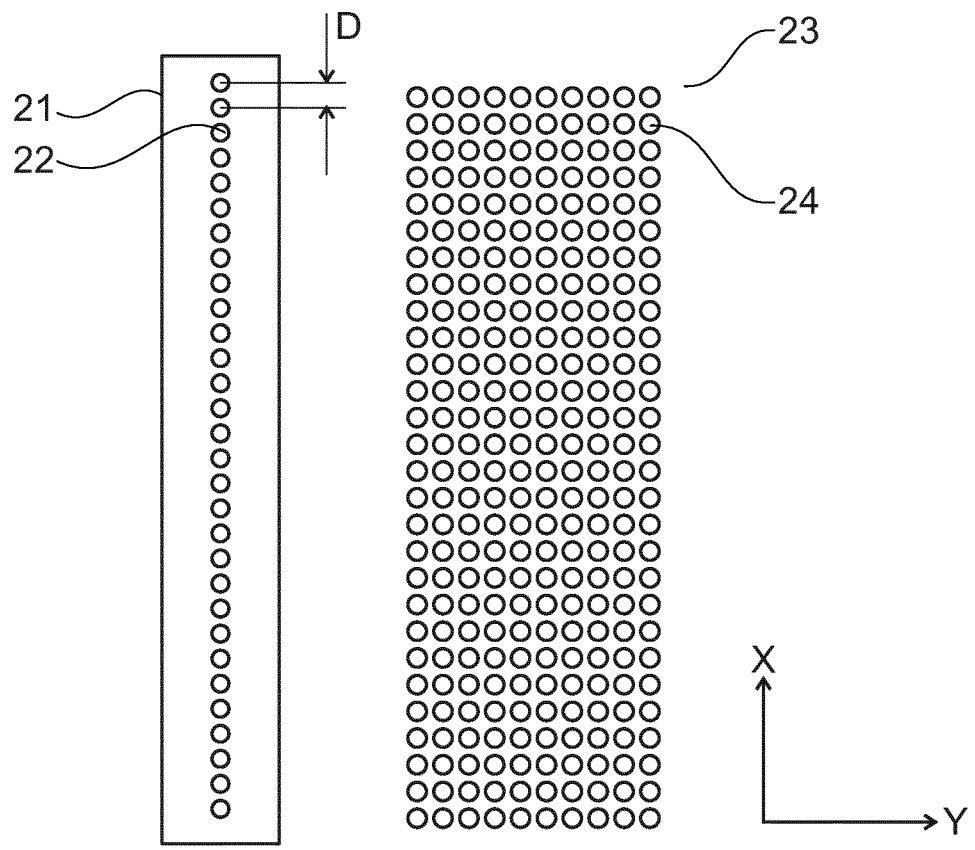
FIG. 5 shows a schematic drawing of a resolution of a print bitmap.

In the following, an example of determining a printing parameter or a printing pattern for printing a cover layer on a sample based on a local image parameter is explained. A printing pattern is e.g. a 2D bitmap with certain pitches in the X- and Y-direction. FIG. 5 shows a schematic drawing of a resolution of a print bitmap 23. A print head 21 with nozzles 22 (shown as circles) are depicted on the left; the print bitmap 23 with potential print locations 24 is given on the right.

In one direction (referred to as the X-direction), a resolution is determined by a hardware of the print head 21, which means the resolution used in the X-direction (X-pitch) has to be a multiplication of a nozzle pitch. N times larger pitches can be created by selective turning off every $N^{th}$ nozzle 22; smaller pitches (1/N*nozzle pitch) can be created by using all nozzles 22 and repeating N−1 times while increasing the offset by X/N each time. In the forward print direction (Y-direction), the pitch can be freely chosen limited by the resolution of the Y-stage and/or the firing frequency of the print head 21 divided by the speed. The smaller the pitch, the larger the average thickness of the resulting layer.

A print protocol is controlled essentially in two ways, (i) the local pitch of the printed droplets in a single sweep, and (ii) a sequence of sweeps. Each sweep can have its own bitmap.

Based on image analysis, which means based on a local image parameter, a model can be derived for an optimal printing pattern. In this model, different parameters can be included:

Average Porosity (P):

The porosity can be used to calculate an optimal layer thickness L*. E.g. a minimal layer thickness $L_{min}$ can be printed and for areas with a higher porosity a thicker layer can be applied. The relation between porosity and applied layer thickness can e.g. be: $L^*=L_{min}+alpha^*P$.

Capillary Diameter (R) and Orientation:

A capillary pressure scales with 1/R. Furthermore, the average orientation of the capillaries should be taken into account as well. These factors combined can be used to create a heat map with the capillary forces and the amount of spreading.

Figure 6:
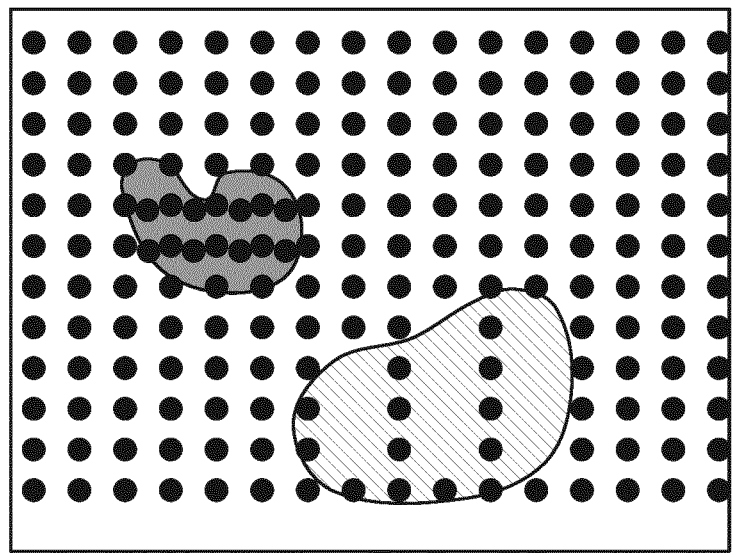
FIGS. 6 and 7 describe how printing patterns can be adjusted based on results of an image analysis.
Figure 7:
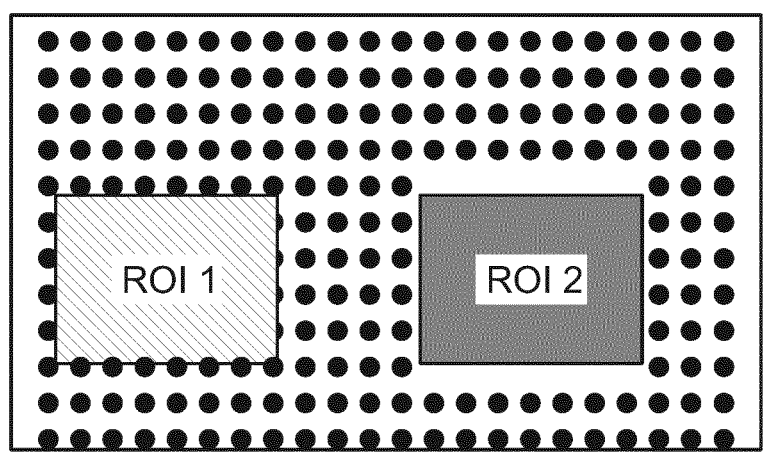

FIGS. 6 and 7 describe how a printing parameter or printing patterns can be adjusted based on a local image parameter or results of an image analysis as shown above. FIG. 6 shows an embodiment with a less dense area (light gray) and a denser area (dark gray) onto which different layer thicknesses are deposited. FIG. 7 shows an embodiment where the spreading around the ROI (dot size) is adjusted for the tissue properties.

Porosity:

In FIG. 6, an example is given of areas with a different average porosity. The white region is tissue. In light grey, an area of large porosity is given which needs more ink for full coverage, and in dark grey a more dense tissue area is given which needs less ink. To achieve this, the Y-pitches are locally adjusted.

Capillary Properties:

Two ROIs are indicated in FIG. 7. The capillary pressure in the tissue around ROI1 is lower and therefore the droplets can be deposited closer to the boundary of the ROI. Spreading around ROI2 is expected to be larger and therefore a larger ROI is designed to compensate for the spreading. In this case, only the average capillary sizes are taken into account, assuming homogeneous orientation of the capillaries.

In the following, additional embodiments for printing strategies are explained. In one embodiment, a printing pattern is distributed over several sweeps. In this way, the X-pitch can be adjusted by choosing offsets that are smaller than the X-pitch. At the same time, the printing pattern can be varied locally to achieve the required resolutions. Since liquid spreading is a dynamic process, sequential spreading can help to control the flow direction of the liquid and the control over the final liquid distribution. This effect can be strongly amplified by introducing an intermediate curing step.

As an example, "dyke-like" structures can be printed in a first step which are then cured and therefore do not contribute to the liquid in the second step, however, affect the topology and local porosity that controls the flow of the ink in the consecutive printing steps. Local spreading is easier to predict than cumulative spreading. As an example, one can print a closed front around an ROI in the first step in which the ROI definition is controlled by the 1-dimensional spreading of this front. After curing, the area outside the ROI is confined by a dyke and can therefore be filled up with a thicker layer of ink without risk of spreading into the ROI.

An alternative embodiment uses multiple print sweeps with image analysis and printing pattern correction in between. Instead of analyzing an image before printing, a thick layer is deposited first onto the larger areas, where there is no risk of flooding (further away from any ROIs). Then, an image is made and a local ink spreading is analyzed. Based on the results, a second print bitmap can be created to fine-tune the printing pattern.

Figure 8:
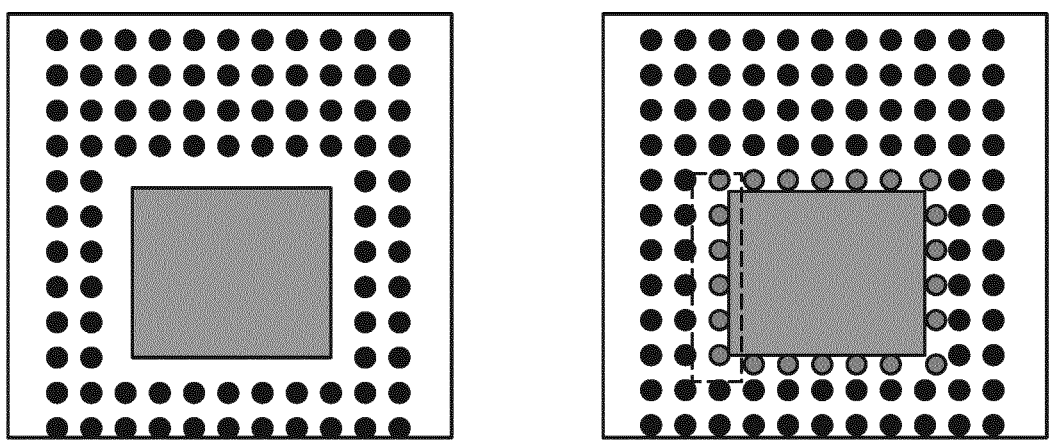
FIG. 8 shows schematically and exemplarily an intermediate image analysis where the area surrounding a ROI is optimized.

An example is given in FIG. 8 showing an intermediate image analysis where the area surrounding a ROI is optimized. On the left of FIG. 8, a printing pattern of a first print stroke is given, wherein the positions where a droplet is fired are marked in black. Purposely an area around the ROI is kept open. After the first print stroke, an image is made and a local spreading is calculated. As indicated before, this spreading depends on local tissue properties and can thus vary around the perimeter of the ROI. This is visualized on the right of FIG. 8. For example, when spreading in one area of a tissue is relatively large (simulated in an area located within the dashed box), the droplets of a second print stroke (indicated in grey) are deposited further away from the ROI. In this way, a gap around the ROI can be nicely filled up with ink without significant spreading into the ROI.

Figure 9:
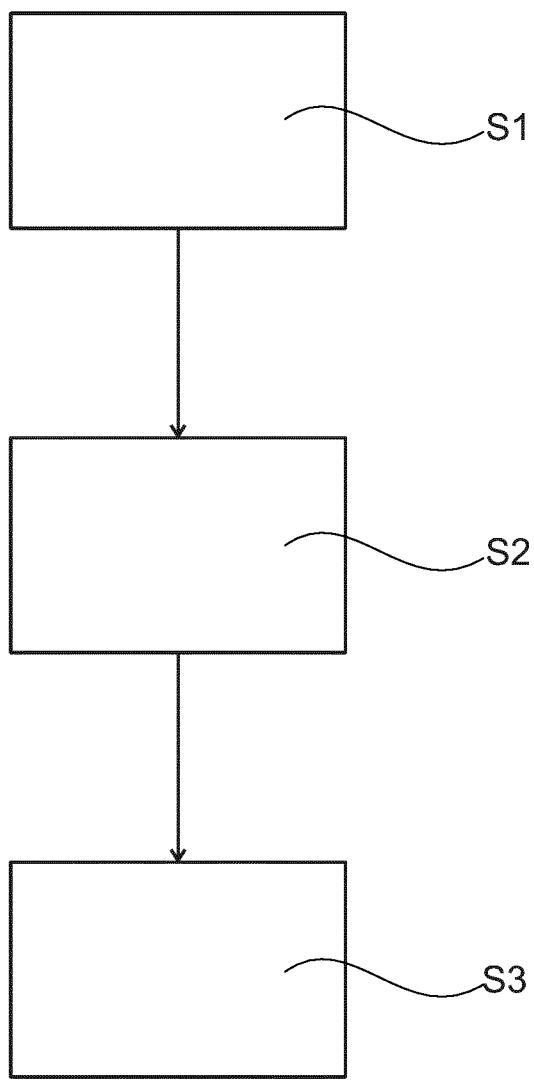
FIG. 9 shows basic steps of an example of an X-ray imaging method.

Many further embodiments can be foreseen. One common step may be an analysis of the tissue before printing or in between multiple print sweeps and subsequently using this information to optimize the print pattern. FIG. 9 shows a schematic overview of steps of method to control printing of a cover layer on a tissue or cell sample to be examined. The method comprises the following steps, not necessarily in this order:

In a first step S1, providing image data of the sample.

In a second step S2, determining a local image parameter from the image data.

In a third step S3, controlling a printing parameter for printing the cover layer on the sample based on the local image parameter. The local image parameter relates to local tissue porosity and/or a local capillary force of the sample.

The method may further comprise a step of controlling an initial printing parameter for initially printing an initial cover layer on the sample. This initial printing can be made before step a). The method may further comprise a step of controlling a curing parameter for curing the initial cover layer and/or the cover layer. This curing can be made after an initial printing and/or after step c). The method may further comprise a step of removing a region of interest of the sample which is indicated and/or not covered by the cover layer. This removing can be made after step c).

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it, which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A printing control device to control printing of a cover layer on a tissue or cell sample to be examined, comprising:
   an imaging unit; and
   a printing control unit communicatively coupled to the imaging unit,
   wherein the imaging unit is configured to provide image data of the sample,
   wherein the imaging unit is further configured to analyze the image data of the sample to determine a local image parameter of the sample from the image data, wherein the local image parameter relates to locally varying tissue porosity and/or a locally varying capillary force of the sample, wherein the image data reveals the locally varying tissue porosity and/or the locally varying capillary force, and
   wherein the printing control unit is configured to control a locally different printing parameter for printing the cover layer on the sample based on the local image parameter, wherein the printing control unit is configured to provide the cover layer at one thickness in one area of the sample different than a thickness of the cover layer in an area of the sample revealed in the image data as having the locally varying tissue porosity and/or the locally varying capillary force.

2. The printing control device according to claim 1, wherein the printing parameter is at least one of a group comprising a local pitch of printing droplets, a sequence of printing sweeps, a height of a print pulse and a shape of a print pulse.

3. The printing control device according to claim 1, wherein the printing control unit is configured to control a printing parameter for ink jet printing the cover layer on the sample.

4. The printing control device according to claim 1, wherein the printing control unit is further configured to control an initial printing parameter for initially printing an initial cover layer on the sample independent of an image parameter.

5. The printing control device according to claim 4, wherein the local image parameter relates to a local spreading characteristic of a printing ink on the sample.

6. The printing control device according to claim 4, wherein the printing control unit is further configured to control a curing parameter for curing the initial cover layer and/or the cover layer after printing.

7. The printing control device according to claim 1, wherein the printing control unit is further configured to control a curing parameter for curing the cover layer after printing.

8. A system for printing of a cover layer on a tissue or cell sample to be examined, comprising:
   a printing control device according to claim 1, and
   a printing module,
   wherein the printing control device is configured to control the printing of the cover layer on the sample, and
   wherein the printing module is configured to print the cover layer on the sample.

9. The system according to claim 8, wherein the printing module is an ink printing module.

10. The printing control device according to claim 1, wherein the local image parameter relates to the locally varying tissue porosity and the locally varying capillary force of the sample.

11. A method to control printing of a cover layer on a tissue or cell sample to be examined, comprising the following steps:
   a) providing image data of the sample;
   b) determining a local image parameter of the sample by using image analysis on the image data of the sample, wherein the local image parameter relates to locally varying tissue porosity and/or a locally varying capillary force of the sample, wherein the image data reveals the locally varying tissue porosity and/or the locally varying capillary force; and
   c) controlling a locally different printing parameter for printing the cover layer on the sample based on the local image parameter, wherein the printing includes printing the cover layer at one thickness in one area of the sample different than a thickness of the cover layer in an area of the sample revealed in the image data as having the locally varying tissue porosity and/or the locally varying capillary force.

12. The method according to claim 11, further comprising a step of:
   controlling the printing parameter for printing the cover layer related to at least a region of interest of the sample.

13. The method according to claim 11, further comprising a step of:
   controlling the printing parameter for printing the cover layer to spare at least a region of interest of the sample out of which biomolecules are to be extracted.

14. The method according to claim 13, further comprising a step of:
   controlling an initial printing parameter for initially printing an initial cover layer on the sample.

15. The method according to claim 14, further comprising a step of:
   removing biomolecules from a region of interest of the sample after printing of the cover layer.

16. A non-transitory computer readable storage medium having stored a computer program element for controlling a device or system, which, when being executed by a processing unit, is adapted to perform the method steps of claim 11.

17. The method according to claim 11, wherein the local image parameter relates to the locally varying tissue porosity and the locally varying capillary force of the sample.

* * * * *